United States Patent [19]

Shibayama et al.

[11] 4,051,091

[45] Sept. 27, 1977

[54] WATER-DISPERSION VARNISH FOR ELECTRODEPOSITION AND PROCESS FOR MAKING SAID WATER DISPERSION VARNISH

[75] Inventors: Kyoichi Shibayama; Hiroshi Ono; Eiki Jidai; Akira Fujii, all of Amagasaki, Japan

[73] Assignee: Mitsubishi Denki Kabushiki Kaisha, Tokyo, Japan

[21] Appl. No.: 525,065

[22] Filed: Nov. 19, 1974

[51] Int. Cl.$^2$ .................. C08J 3/10; C08L 79/08; C25D 13/06; C25D 13/20
[52] U.S. Cl. .................. 260/29.2 TN; 204/181; 260/29.2 N
[58] Field of Search .................. 260/29.2 N, 29.2 TN; 204/181

[56] References Cited

U.S. PATENT DOCUMENTS

| 3,007,852 | 1/1968 | Hunter et al. | 203/49 |
|---|---|---|---|
| 3,230,162 | 1/1966 | Gilchrist | 204/181 |
| 3,444,066 | 5/1969 | Brewer et al. | 204/181 |
| 3,448,017 | 6/1969 | Chang et al. | 204/181 |
| 3,475,282 | 8/1969 | Hamilton | 203/49 |
| 3,533,998 | 10/1970 | Yolles | 260/29.2 N |
| 3,663,402 | 5/1972 | Christenson et al. | 204/181 |
| 3,766,117 | 10/1973 | McQuade | 260/29.2 N |
| 3,787,338 | 1/1974 | Skelly et al. | 260/29.2 N |
| 3,846,269 | 11/1974 | Martello et al. | 204/181 |
| 3,860,546 | 1/1975 | Tsou | 204/181 |

FOREIGN PATENT DOCUMENTS 1,036,426   8/1958   Germany .................. 260/29.2 N Primary Examiner—Allan Lieberman
Attorney, Agent, or Firm—Oblon, Fisher, Spivak, McClelland & Maier

[57] ABSTRACT

A water dispersion varnish suitable for electrodepositon is prepared by a process comprising reacting:

the reaction product of
 A. a polyesterimide having a carboxyl group in its chain or at the terminus of the chain and having an ester group and an imide group in its repeating unit or a polyesteramideimide having a carboxyl group in its chain or at the terminus of the chain and having an ester group, an imide group and an amide group in its repeating unit and
 B. an organic compound having at least two hydroxyl groups with
 C. a polybasic acid or its anhydride in the presence or absence of a solvent yielding a modified polyesterimide or polyesteramideimide;

dissolving said modified polyesterimide or polyesteramideimide in an organic solvent;

dispersing said modified polyesterimide or polyesteramideimide solution in an aqueous solution containing a surfactant and a volatile base; and removing the volatile components.

10 Claims, No Drawings

WATER-DISPERSION VARNISH FOR ELECTRODEPOSITION AND PROCESS FOR MAKING SAID WATER DISPERSION VARNISH

BACKGROUND OF THE INVENTION

1. Field of the Invention

The present invention relates to a process for preparing a water-dispersion varnish for electrodeposition, and more particularly, it relates to a process for preparing a water-dispersion varnish for electrodeposition which comprises a modified polyesterimide having ester groups and imide groups in the main chain or a modified polyesteramideimide having an ester group, an imide group and an amide group in the main chain.

2. Description of the Prior Art

Electrodeposition of resin coatings onto conductive substances is commonly used in many technologies. The electrodeposition coating method has several advantages: it is safe and hygienic because it employs no organic solvent; it can form a film of uniform thickness in a short period of time; and it is easily automated as compared with conventional spray coating or dip coating methods.

In the usual instance, a varnish is used in the electrodeposition process, wherein a coatable polymeric composition is either dissolved into an electrolyte medium or is dispersed in fine particles having diameters of $0.1\mu$. When a solution varnish is used, uniform deposition can be attained even in a thin layer. However, the thickness of the film may only be as large as several tens of microns. Accordingly, solution varnish is not suitable if a thickness larger than $100\mu$ is required. Moreover, most water soluble or water insoluble polymers used for the solution varnish will contain many easily dissociated groups so that a coating employing such polymers would not be a good electrical insulator.

On the other hand, a dispersion varnish is inferior to a solution varnish from the viewpoint of uniformity of film thickness. It is difficult to form such a uniform film on a substrate having a complicated shape. However, dispersion varnish has the advantages in that a thick film can be formed easily in a short period of time and the durability of the finished film can be improved by using a polymer having a high molecular weight. Moreover, the polymer used in the dispersion varnish is not easily dissociated and, accordingly, a film containing it will have good electrical insulation properties.

A need therefore exists for a water-dispersion varnish that is capable of providing an electrodeposition coating of good uniformity. Such a varnish would be expected to find a great deal of acceptance in a wide variety of fields.

There are two methods for preparation of a water-dispersion polymer: by emulsion-polymerization using monomers having an unsaturated group; or by dispersing a polymer by suitable processes. The monomers used for the former method are limited to vinyl compounds and accordingly, the characteristics of the finished films are limited. In the latter method, good electrical insulation properties of the finished films can be produced by employing epoxy resin, polyester resin, formal resin, etc. However, it is quite difficult to prepare a water-dispersion varnish of the latter type which is suitable for electrodeposition. Accordingly, this type of varnish has not been commercialized.

Recently, polyesterimides and polyesteramideimides have been found to possess excellent electrical insulation characteristics and excellent thermal stability. They are quite economical and hence have been widely used. It would be most desirable to prepare a water-dispersion varnish which is suitable for electrodeposition by using such resins.

SUMMARY OF THE INVENTION

Accordingly, it is one object of the present invention to provide a process for preparation of a water-dispersion varnish of polyesterimide or polyesteramideimide which can be uniformly electrodeposited yielding a coating having good electrical insulation properties and thermal stability.

This and other objects of this invention, as will hereinafter be made clear by the discussion below have been attained by a process for preparing a water-dispersion varnish suitable for electrodeposition which comprises reacting the reaction product of (A) a polyesterimide having a carboxyl group in its chain or at the terminus of the chain, and having an ester group and an imide group in its repeating unit, or a polyesteramideimide having a carboxyl group in its chain or at the terminus of the chain and having an ester group, an imide group and an amide group in its repeating unit and (B) an organic compound having hydroxyl groups with (C) a polybasic acid or its anhydride in the presence or absence of a solvent yielding a modified polyesterimide or polyesteramideimide; dissolving said modified polyesterimide or polyesteramideimide in an organic solvent; dispersing said modified polyesterimide or polyesteramideimide solution in an aqueous solution containing a surfactant and a volatile base; and removing the volatile components.

DETAILED DESCRIPTION OF THE PREFERRED EMBODIMENTS

The polyesterimides used in this invention are those having a carboxyl group in the chain or at the terminus of the chain and having a ester group and an imide group in the repeating unit and having a molecular weight of several thousands to several tens of thousands, or a polyesteramideimide having a carboxyl group in its chain or at the terminus of the chain and having an ester group, an imide group and an amide groups in the repeating unit and having an average molecular weight of several thousands to several tens of thousands. This material is reacted with a polyalcohol, e.g., glycol, glycerine or a polyester having free hydroxyl groups followed by reaction of an admixed polybasic acid or anhydride thereof, e.g., tetrahydrophthalic acid anhydride, adipic acid, trimellitic acid anhydride. The resulting product is used as a starting material (hereinafter referred to as a modified polyesterimide or a modified polyesteramideimide). The modified polyesterimide or polyesteramideimide is dissolved in suitable solvent and an aqueous solution containing a small amount of a surfactant and a volatile base, e.g., ammonium hydroxide are added to the solution and the mixture is stirred at a temperature within the range of ambient to 80° C. Then, an inert gas, e.g., nitrogen, is bubbled through the mixture so as to remove a part or all of the solvent and the volatile base, whereby a stable water-dispersion varnish is produced. A pair of conductive plates or wires are dipped into the resulting water-dispersion varnish and a DC voltage is applied to them, whereby a uniform electrodeposited film is coated onto the anode. Subsequent curing imparts excellent mechanical strength to the coated film.

The polyesterimides used in the invention include the reaction product of trimellitic acid anhydride, diaminodiphenylmethane and polyethyleneterephthalate. The polyesteramideimides used in the invention include the reaction product of trimellitic acid anhydride, diphenylmethane-4,4'-diisocyanate, polyethyleneterephthalate, ethyleneglycol and tris-(β-hydroxyethyl)-isocyanurate.

The polyesterimides used as starting material in this invention include the reaction product of 9-49 equivalent % of dibasic acid, 5-40 equivalent % of a polycarboxylic anhydride having at least 3 carboxyl groups, 16-48 equivalent % of a monobasic lower aliphatic diester of an aromatic dicarboxylic acid, 0-40 equivalent % of a polyol having at least 2 hydroxyl groups and 2.5-60 equivalent % of an amino compound having two amino groups. Suitable dibasic acids include terephthalic acid, isophthalic acid and adipic acid. Suitable polycarboxylic anhydrides include trimellitic acid anhydride, pyromellitic acid dianhydride and 3.3', 4.4'-benzophenonetetracarboxylic acid anhydride. Suitable monobasic lower aliphatic diesters of an aromatic dicarboxylic acid include dimethyl terephthalate and dimethyl isophthalate. Suitable polyols include glycerine, tris (β-hydroxyethyl)isocyanurate, trimethylolethane, pentaerythritol, ethylene glycol, propylene glycol and diethylene glycol. Suitable amino compounds include 4.4'-diaminodiphenylmethane, 4.4'-diaminodiphenylether, 4.4'-dioxydiphenylethane, octamethylenediamine and p-xylenediamine. The molecular weight of the polyesterimide as measured by a viscosity method, is preferably 1,000-100,000, especially 5,000-10,000.

The polyesteramideimides used as a starting material in the invention include the reaction product of 20-60 equivalent % of polycarboxylic anhydride having at least 3 carboxyl groups, 10-30 equivalent % of diisocyanate, 15-50 equivalent % of a monobasic lower aliphatic diester of an aromatic dicarboxylic acid, 0-40 equivalent % of a polyvalent alcohol and 3-60 equivalent % of an amino compound having two amino groups. Suitable polycarboxylic anhydrides have at least 3 carboxylic groups; suitable monobasic lower aliphatic diesters of an aromatic dicarboxylic acid, suitable polyvalent alcohols and suitable amino compounds having two amino groups for this reaction include the compounds mentioned above. Suitable diisocyanates include tolylenediisocyanate, diphenylmethanediisocyanate, diphenyletherdiisocyanate, hexamethylenediisocyanate and paraphenylenediisocyanate. The molecular weight of the polyesteramideimide as measured by the viscosity method is preferably 1,000-100,000 especially 5,000-10,000.

The concept of the invention is to prepare a water-dispersion varnish for electrodeposition by modifying these polyesterimides or the polyesteramideimides.

The polyalcohols used in the invention include ethylene glycol, propylene glycol, glycerine, tris-(β-hydroxyethyl)isocyanurate, or a polyester oligomer having a free hydroxyl group, etc. Each must have at least two hydroxy groups. The polybasic acids used in the invention include adipic acid, isophthalic acid, maleic acid, tetrahydrophthalic acid, trimellitic acid, etc., each of which has at least two carboxyl groups. The corresponding acid anhydrides thereof can also be used.

The purpose of the solvents used in the invention is to dissolve or swell the modified polyesterimide or polyesteramideimide. It is necessary to use solvents which have a boiling point lower than 100° C or which can be removed by an azeotropic distillation at lower than 100° C. Suitable solvents include ethylenedichloride, dioxane, methylethyl ketone, acetone, m-cresol, dimethylformamide, N-methylpyrrolidone, dimethyl acetamide, dimethyl sulfoxide, etc. or mixtures thereof. It is possible to add a small amount of a solvent having high boiling point, e.g., m-cresol, dimethyl formamide, N-methylpyrrolidone, etc. so as to improve solubility. The surfactants include anionic surfactants, nonionic surfactants and mixtures thereof. Suitable such surfactants include sodium lauryl sulfate, sodium dodecylbenzene sulfonate, sodium octyl sulfosuccinate, polyoxyethylene alkylether, etc. The volatile bases used in the invention include ammonium hydroxide, trimethylamine, monoethanolamine, α-dimethylaminoethanolamine and mixtures thereof.

The modified polyesterimide or polyesteramideimide should have an average molecular weight of 5,000-100,000. Modified polymers having a molecular weight of less than 5,000 may dissolve in water. On the other hand, modified polymers having a molecular weight of higher than 100,000 may be difficult to disperse into water.

The acid value of the modified polyesterimide or polyesteramideimide should be in the range of 10-100, preferably 15-60.

Having generally described the invention, a more complete understanding can be obtained by reference to certain specific examples, which are included for purposes of illustration only and are not intended to be limiting unless otherwise specified.

REFERENCE 1

400 wt. parts of 80% m-cresol solution of polyesterimide prepared by polymerizing 103 g of diaminodiphenylmethane, 200 g of trimellitic acid anhydride, 150 g of polyethylene terephthalate and 60 g of glycerine (average molecular weight 5,000) was heated to 180° C and 12 wt parts of glycerine was admixed with the solution. Reaction was carried out at 180° C for 1 hour. 18 wt parts of tetrahydrophthalic anhydride was admixed with the reaction product. Reaction was carried out at 180° C for 30 minutes. After the reaction, 160 wt parts of dioxane was added dropwise to the reaction mixture to produce a solution having about 60% solid content. In a four necked flask, 300 parts of 0.4% ammonium hydroxide containing 1.0 wt part of sodium lauryl sulfate was charged. The flask was heated to 60° C and 150 wt parts of said solution having about 60% of solid content was then placed into the flask and the mixture was stirred for 30 minutes yielding an aqueous dispersion having a pH of 9.5. The aqueous dispersion was placed into a beaker and a coated film was obtained by electrodepositing the varnish onto a copper plate. Only a non-uniform electrodeposited film having a thickness of 10μ was produced.

EXAMPLE 1

Nitrogen was bubbled through the stirred aqueous dispersion of Reference 1 at 60° C for 4 hours so as to remove excess ammonia and the solvent, whereby an aqueous dispersion having a pH of 7.5 was obtained. The aqueous dispersion was placed in a beaker and a DC voltage of 20 volts was applied so as to electrodeposit the polymer on a copper plate, whereby a uniform electrodeposited film was produced. It was possible to form a uniform electrodeposited film having a thickness of about 300 μ by electrodepositing for a long period.

The coated film cured at 250° C for 45 minutes had excellent mechanical strength.

EXAMPLE 2

150 wt parts of the solution of the modified polyesterimide having 60% solid content which is described in Reference 1 was added to 300 wt parts of aqueous solution containing 1.5 wt parts of monoethanolamine at 70° C. The mixture was refluxed for 30 minutes at 70° C and then was stirred for 6 hours at 70° C under a stream of nitrogen so as to remove volatile components, whereby an aqueous dispersion having a pH of 8 was obtained. In accordance with the process of Example 1, electrodeposition was carried out using the resulting aqueous dispersion, whereby a uniform electrodeposited film was produced. The coated film cured at 250° C for 45 minutes had excellent mechanical strength.

EXAMPLE 3

100 wt parts of the modified polyesterimide which is described in Reference 1, was dissolved in 50 wt parts of ethylenedichloride. The solution was heated to 50° C and was added to 300 wt parts of an aqueous solution containing 0.5 wt parts of sodium lauryl sulfate, 0.5 wt parts of polyoxyethylene lauryl ether, and 10 wt parts of trimethylamine at 50° C. The mixture was stirred for 5 hours under a stream of nitrogen so as to remove volatile components, whereby an aqueous dispersion having a pH of 7.2 was obtained. In accordance with the process of Example 1, electrodeposition was carried out using the resulting aqueous dispersion, whereby a uniform electrodeposited film was produced.

EXAMPLE 4

400 wt parts of 80% N-methylpyrrolidone solution of polyesterimide prepared by polymerizing 116 g of hexamethylenediamine, 384 g of trimellitic anhydride, 250 g of polyethyleneterephthalate, 120 g of tris-($\beta$-hydroxyethyl)-isocyanurate (average molecular weight 9,000) was heated to 180° C and 5 wt parts of glycerine and 15 wt parts of trimellitic anhydride were admixed with the solution. Reaction was carried out for 30 minutes. After the reaction, 100 wt parts of methylethyl ketone was added dropwise to the reaction mixture producing a solution having about 65% solid content. The solution was heated to 70° C and was added to 2,000 wt parts of an aqueous solution containing 4.0 wt % of sodium dioctyl sulfosuccinate and 10 wt % of ammonium hydroxide, and the mixture was stirred for 7 hours at 70° C under a stream of nitrogen to remove volatile components whereby an aqueous dispersion having a pH of 7.0 was obtained. In accordance with the process of Example 1, electrodeposition was carried out using the resulting aqueous dispersion, whereby a uniform electrodeposited film was produced. The coated film cured at 250° C for 45 minutes had excellent mechanical strength.

EXAMPLE 5

400 wt parts of 90% N,N'-dimethylacetamide solution of polyesteramideimide prepared by polymerizing 384 g of trimellitic anhydride, 250 g of diphenylmethane-4,4'-diisocyanate, 300 g of polyethyleneterephthalate, 64 g of ethylene glycol and 100 g of tris-($\beta$-hydroxyethyl)-isocyanurate (average molecular weight 7,000) was heated to 170° C and 10 wt parts of propylene glycol and 15 wt parts of isophthalic acid were admixed with the solution. Reaction was carried out for 20 minutes. After the reaction, 150 wt parts of acetone was added dropwise to the reaction mixture to produce a solution having about 60% solid content. The solution was heated to 80° C and was added to 1,500 wt part of an aqueous solution containing 2.5 wt parts of sodium dodecyl benzene sulfonate and 15 wt parts of triethanolamine, and the mixture was stirred for 4 hours at 80° C under a stream of nitrogen to remove volatile components, whereby an aqueous dispersion having a pH of 7.7 was obtained. In accordance with the process of Example 1, electrodeposition was carried out using the resulting aqueous dispersion, whereby a uniform electrodeposited film was produced. The coated film cured at 230° C for 1.5 hours had excellent mechanical strength.

EXAMPLE 6

200 wt parts of 90% m-cresol solution of the polyesteramideimide which is described in Example 5 was heated to 180° C and 3 wt parts of glycerine and 10 wt parts of trimellitic anhydride were added to the solution. Reaction was carried out for 40 minutes. After the reaction, 35 wt parts of ethyl acetate was added dropwise to the reaction mixture producing a solution having a solid content of about 75%. The solution was heated to 75° C and was added to 1,000 wt parts of an aqueous solution containing 1.0 wt part of sodium lauryl sulfate, 5 wt parts of trimethylamine and 5 wt parts of ammonia, and then the mixture was stirred for 3 hours at 75° C under a stream of nitrogen to remove volatile components, whereby an aqueous dispersion having a pH of 7.3 was obtained. In accordance with the process of Example 1, electrodeposition was carried out using the resulting aqueous dispersion, whereby a uniform electrodeposited film was obtained. The coated film cured at 230° C for 1.5 hours had excellent mechanical strength. The electrodeposition of Examples 1–6 were applied to bare copper wire having a diameter of 1 mm. The coated wires were baked and their characteristics measured. The satisfactory results are shown in Table 1.

TABLE 1

|  | Characteristics of Wires | | | | |
|---|---|---|---|---|---|
|  | thickness of film ($\mu$) | repeated *1 scrape abrasion (times) | cut *2 through temperature | *3 heat shock | break down voltage (twisted pairs) KV |
| Example 1 | 30 | 40–50 | 300° C | 2d good | 10 |
| Example 2 | 29 | 40–50 | 300° C | 2d good | 10 |
| Example 3 | 29 | 40–50 | 300° C | 2d good | 11 |
| Example 4 | 30 | 50–60 | 300° C | 2d good | 12 |
| Example 5 | 31 | 80–90 | 300° C | 2d good | 11.5 |
| Example 6 | 30 | 80–90 | 300° C | 2d good | 12 |

*1 600 g load     Japanese Industrial Standard
*2 2 kg load     Japanese Industrial Standard
*3 2 hours at 250°C     Japanese Industrial Standard

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A process for preparing a water-dispersion varnish suitable for electrodeposition which comprises reacting the reaction product of
- A. a polyesterimide having a carboxyl group in its chain or at the terminus of the chain and having an ester group and an imide group in its repeating unit or a polyesteramideimide having a carboxyl group in its chain or at the terminus of the chain and having an ester group, an imide group and an amide group in its repeating unit and
- B. an organic compound having at least two hydroxyl groups with
- C. a polybasic acid or its anhydride in the presence or absence of a solvent yielding a modified polyesterimide or polyesteramideimide having a molecular weight of from 5,000-100,000 and an acid value of 10-100;

dissolving said modified polyesterimide or polyesteramideimide in an organic solvent;

dispersing said modified polyesterimide or polyesteramideimide solution in an aqueous solution containing a surfactant and a volatile base; and forming a water dispersion of said modified polyesterimide or polyester amideimide by passing or bubbling an inert gas through the dispersion of said modified polyesterimide or polyester amideimide solution and said aqueous solution to remove all or part of said solvent and volatile base.

2. The process for preparing a water-dispersion varnish according to claim 1, wherein said polyesterimide is produced by polymerizing 9-49 equivalent % of a dibasic acid, 5-40 equivalent % of a polycarboxylic anhydride having at least 3 carboxyl groups, 16-48 equivalent % of a monobasic lower aliphatic diester of an aromatic dicarboxylic acid, 0-40 equivalent % of a polyol having at least 2 hydroxyl groups and 2.5-60 equivalent % of an amino compound having two amino groups.

3. The process for preparing a water-dispersion varnish according to claim 1, wherein said polyesteramideimide is produced by polymerizing 20-60 equivalent % of polycarboxylic anhydride having at least 3 carboxyl groups, 10-30 equivalent % of diisocyanate, 15-50 equivalent % of a monobasic lower aliphatic diester of an aromatic dicarboxylic acid, 0-40 equivalent % of a polyvalent alcohol and 3-60 equivalent % of an amino compound having two amino groups.

4. The process for preparing a water-dispersion varnish according to claim 1, wherein said organic compound having at least two hydroxyl groups is glycol, such as ethylene glycol, propylene glycol, diethylene glycol, glycerine, tris (β-hydroxyethyl)-isocyanurate, a polyalcohol or a polyester having free hydroxyl groups, and said polybasic acid or anhydride is tetrahydrophthalic acid, adipic acid, terephthalic acid, trimellitic acid, maleic acid, isophthalic acid or an anhydride thereof.

5. The process for preparing a water-dispersion varnish according to claim 1, wherein said solvent is ethylenedichloride, dioxane, methylethylketone, acetone, m-cresol, dimethyl formamide, N-methylpyrrolidone, dimethyl acetamide or dimethyl sulfoxide.

6. The process for preparing a water-dispersion varnish according to claim 1, wherein the volatile base is ammonia, trimethylamine, monoethanolamine or α-dimethylaminoethanolamine.

7. A water-dispersion varnish which is suitable for use in electrodeposition which is formed by reacting the reaction product of
- A. a polyesterimide having a carboxyl group in its chain or at the terminus of the chain and having an ester group and an imide group in its repeating unit or a polyesteramideimide having a carboxyl group in its chain or at the terminus of the chain and having an ester goup, an imide group and an amide group in its repeating unit, and
- B. an organic compound having at least two hydroxyl groups with
- C. a polybasic acid or its anhydride in the presence or absence of a solvent yielding a modified polyesterimide or polyesteramideimide having a molecular weight of from 5,000-100,000 and an acid value of 10-100;

dissolving said modified polyesterimide or polyesteramideimide in an organic solvent;

dispersing said modified polyesterimide or polyesteramideimide solution in an aqueous solution containing a surfactant and a volatile base; and forming a water dispersion of said modified polyesterimide or polyester amideimide by passing or bubbling an inert gas through the dispersion of said modified polyesterimide or polyesteramideimide solution and said aqueous solution to remove at least part of said solvent and volatile base.

8. The varnish of claim 7, wherein said polyesterimide is produced by polymerizing 9-49 equivalent % of a dibasic acid, 5-40 equivalent % of a polycarboxylic anhydride having at least 3 carboxyl groups, 16-48 equivalent % of a monobasic lower aliphatic diester of an aromatic dicarboxylic acid, 0-40 equivalent % of a polyol having at least 2 hydroxyl groups and 2.5-60 equivalent % of an amino compound having two amino groups.

9. The varnish of claim 7, wherein said polyesteramideimide is produced by polymerizing 20-60 equivalent % of polycarboxylic anhydride having at least 3 carboxyl groups, 10-30 equivalent % of diisocyanate, 15-50 equivalent % of a monobasic lower aliphatic diester of an aromatic dicarboxylic acid, 0-40 equivalent % of a polyvalent alcohol and 3-60 equivalent % of an amino compound having two amino groups.

10. The varnish of claim 7, wherein said organic compound having at least two hydroxyl groups is glycol, such as ethylene glycol, propylene glycol, diethylene glycol, glycerine, tris (β-hydroxyethyl)-isocyanurate, a polyalcohol or a polyester having free hydroxyl groups, and said polybasic acid or anhydride is tetrahydrophthalic acid, adipic acid, terephthalic acid, trimellitic acid, maleic acid, isophthalic acid or an anhydride thereof.

* * * * *